Figure 1:
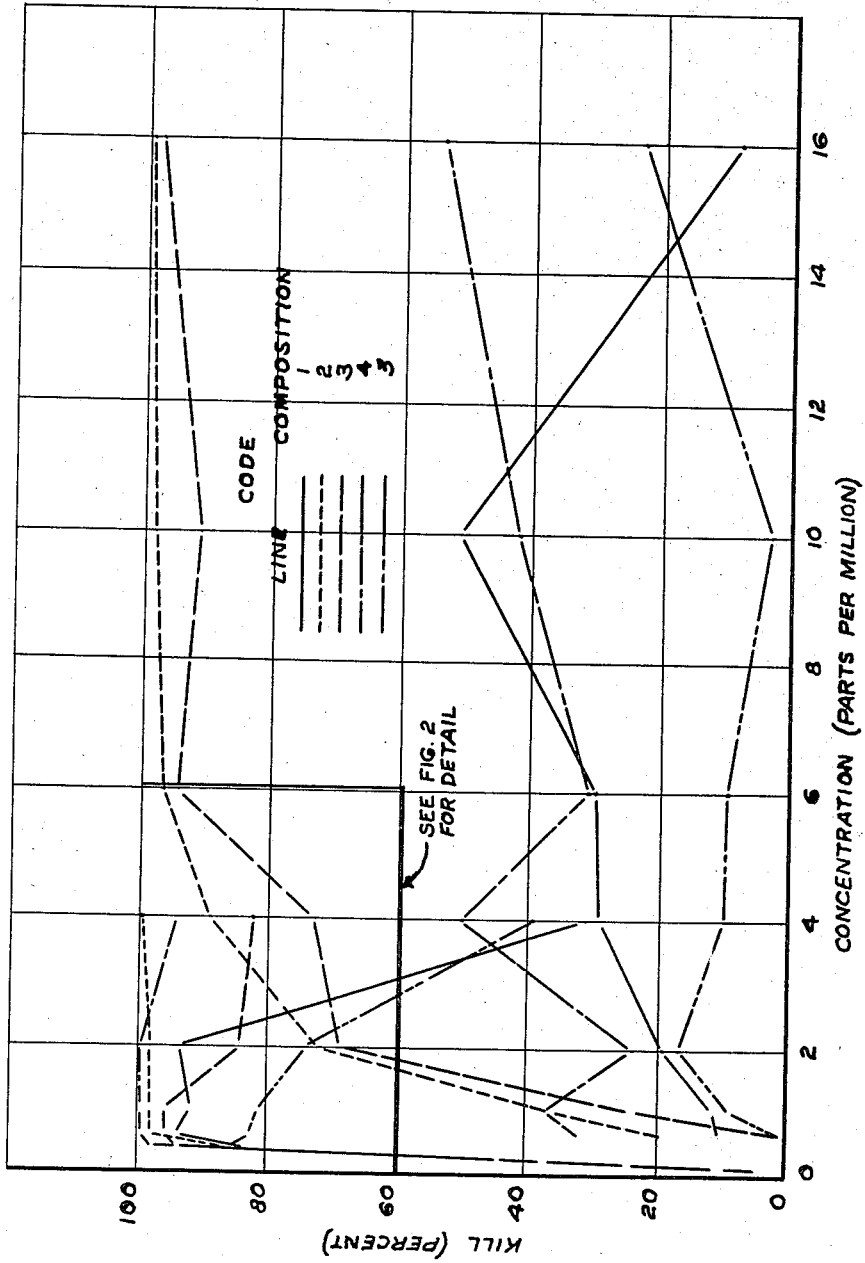

April 7, 1959 J. D. PERA 2,881,070
PROCESSES FOR THE CONTROL OF SLIME-FORMING AND OTHER
MICROORGANISMS AND COMPOSITIONS FOR USE THEREFOR
Filed Oct. 10, 1956 2 Sheets-Sheet 2

JOHN D. PERA
INVENTOR

BY

HIS ATTORNEY

United States Patent Office 2,881,070
Patented Apr. 7, 1959

2,881,070

PROCESSES FOR THE CONTROL OF SLIME-FORM-ING AND OTHER MICROORGANISMS AND COMPOSITIONS FOR USE THEREFOR

John D. Pera, Memphis, Tenn., assignor to Buckman Laboratories, Inc., Memphis, Tenn., a corporation of Tennessee Application October 10, 1956, Serial No. 615,102

10 Claims. (Cl. 92—3)

The present invention relates to compositions for use in the control of slime-forming and other microorganisms, particularly in industrial processes involving water and substances that are normally susceptible to microbiological degradation or deterioration in the presence of water, in which the growth and proliferation of such microorganisms interfere in the process itself or affect the quality or character of the resulting product, and includes processes of using such compositions.

Many industrial products, when wet or when subjected to treatment in water, are normally susceptible to bacterial deterioration or degradation. Wood pulp, starch and proteinaceous substances, animal hides, vegetable tanning liquors, and leather are all damaged or degraded by growth of bacteria and other microorganisms or by enzymes produced by such growth.

Slime consists of matted deposits of microorganisms, fibers and debris, and it may be stringy, pasty, rubbery, tapioca-like, hard or horny and it may have a characteristic odor that is quite unlike that of the liquid suspensions in which it is formed. The microorganisms involved in its formation are primarily different species of sporeforming and nonsporeforming bacteria, particularly capsulated forms of bacteria which secrete gelatinous substances that envelop or encase the cells. Slime microorganisms also include filamentous bacteria, filamentous fungi of the mold type, yeasts, and yeastlike organisms.

Besides being objectionable from the standpoint of general cleanliness and sanitation in breweries, wineries, dairies, paper mills and other industrial plants or establishments, slime may interfere and produce plugging of screens in pulp and paper systems, thus reducing their efficiency. When large amounts of slime become incorporated in the paper sheet, its strength is reduced, and it may consequently break and require rethreading of the machine. In the paper itself, slime may be responsible for unsightly spots, holes, and odors and may produce general discoloration throughout the sheet.

Growth of microorganisms in industrial water supplies, for example, in reservoirs or basins, spray ponds, on heat exchangers or in cooling towers, may produce slime or other solid accumulations which may interfere with normal flow of the water or produce plugging or complete stoppage of the flow through pipes, or in the case of heat-exchangers, reduce the rate of heat transfer.

In groundwood pulp, the presence of aerobic bacteria interferes with peroxide bleaching treatments to which such pulp may be subjected, since the enzyme catalase produced by such bacteria accelerates decomposition of the peroxide and thereby reduces its effectiveness in the treatment.

The desirability of controlling the growth of microorganisms for these and other purposes is apparent from the great number of toxicants or preservatives whose use for such purposes has heretofore been suggested. In such uses, the quantity of toxicant that is required, its cost, its effectiveness in any particular application, and its persistence or ease of removal from the finished product, as well as its continued effectiveness over long periods of use, are factors which must be considered. Traces of several toxicants which are used for these purposes are difficult to remove and impart their persistent and disagreeable odor to products with which they have been in contact. Many toxicants are sensitive to changes in pH values of the media in which they are used and may lose activity or precipitate in pH ranges for which they are not adapted.

It is the object of the present invention to provide a composition for control of microorganisms, particularly slime-forming microorganisms in paper-mill waters, which shall have a high degree of effectiveness in great dilutions and at pH values over the wide range normally encountered in such uses, and can be used as the sole active toxicant or control agent which normally is relatively completely removed from the finished product by washing with water. Other objects and advantages of the present invention, some of which are referred to hereinafter, will be obvious to those skilled in the art to which this invention pertains.

In prior copending application Serial No. 494,286, filed March 14, 1955, now abandoned, which was replaced by continuation-in-part applications Serial No. 617,278, filed October 22, 1956 (issued December 10, 1957, as Patent No. 2,816,136), and Serial No. 671,396, filed July 12, 1957 (issued as patent on even date herewith), the use of alkali-metal and alkaline-earth-metal salts of cyanodithioimidocarbonic acid, such as the sodium salt represented by the formula:

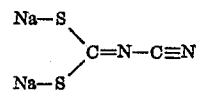

was disclosed for this purpose. It has now been found that the addition of lower alkylenediamines such as ethylenediamine (1,2-diaminoethane) and propylenediamine (1,2-diaminopropane) to aqueous solutions of the foregoing alkali-metal and alkaline-earth-metal salts of cyanodithioimidocarbonic acid enhances their effectiveness, particularly in the range of pH values between approximately 4.0 and approximately 8.0, which are those normally encountered in white waters and wood pulps in normal pulp and paper-mill operations, and that consequently smaller amounts of the active constituents of these microbiological control compositions may be used and they will retain their effectiveness over a wider range of pH changes to which the water or products may be subjected. Although compositions containing such salts of cyanodithioimidocarbonic acid without alkylenediamines are equally as effective as those containing alkylenediamines, at pH ranges between approximately 4.0 and approximately 5.5, they are much less effective in the range between 5.5 and 8.0; thus, comparatively, it may be stated that below a pH of approximately 5.5, addition of an alkylenediamine produces no substantial improvement in the effectiveness of the alkali-metal or alkaline-earth-metal salt of cyanodithioimidocarbonic acid, but at higher pH values, namely, between 5.5 and 8.0, where the salt of cyanodithioimidocarbonic acid is not as effective as at lower pH ranges, the alkylenediamine maintains the cyanodithioimidocarbonate at an optimum effectiveness.

The term alkylenediamine as used herein is to be understood to include 1,2-diaminoethane (ethylenediamine) as well as all other lower diaminoalkanes having fewer than six carbon atoms in which the amino substituent radicals are on adjacent carbon atoms, for example, 1,2-diaminopropane (propylenediamine), and 2,3-diamino-2,3-dimethylbutane, each of which acts in essentially the same manner as does ethylenediamine.

The mechanism to which the effectiveness of cyanodithioimidocarbonic acid or its alkali-metal and alkaline-earth-metal salts or their combinations with alkylenediamines can be ascribed, has not been established. However, it is not unlikely that, at the small concentrations (high dilutions) at which they are used, they are present as or are converted to a highly reactive ion or molecular structure which may not be exactly the same as that which exists in concentrated aqueous solutions or in the individual components themselves. The effectiveness of combinations of alkylenediamines and alkali-metal salts of cyanodithioimidocarbonic acid in dilute solutions is even more difficult to explain from experimental results which have been obtained with concentrated solutions. Some of these experimental results with concentrated solutions, which indicate that the two do not react with each other, are as follows:

(1) When a solution containing approximately 20 percent by weight of sodium cyanodithioimidocarbonate and one molecular equivalent of ethylenediamine is acidified with dilute sulfuric acid, an amorphous gum separates and the major portion of the ethylenediamine is found in the aqueous phase.

(2) When a 20-percent aqueous solution of sodium cyanodithioimidocarbonate containing one molecular equivalent of ethylenediamine is distilled by heating under vacuum and nitrogen gas is charged through during the distillation, until the residue becomes resinous and cannot be further distilled, the distillate contains a substantial proportion (approximately 20 percent) of the ethylenediamine that was originally present.

(3) The depression of the freezing point of water that is produced, when sodium cyanodithioimidocarbonate is dissolved in water (in an amount corresponding to 3.58 grams of sodium cyanodithioimidocarbonate per 100 grams of solution), is 1.562° C. When ethylenediamine is added to form a solution containing 3.58 grams of sodium cyanodithioimidocarbonate and 1.33 grams (one molecular equivalent) of ethylenediamine per 100 grams of solution, the freezing point is further depressed 0.520° C. The freezing point of a solution containing 1.33 grams of ethylenediamine per 100 grams of solution is 0.432° C. below the freezing point of water. Consequently, in such solutions, the ethylenediamine does not appear to be combined with the cyanodithioimidocarbonate.

(4) The ultraviolet absorption spectra of (1) solutions of sodium cyanodithioimidocarbonate and (2) solutions containing a mixture of an equimolecular proportion of ethylenediamine and of sodium cyanodithioimidocarbonate over the range between 750 to 3600 parts of sodium cyanodithioimidocarbonate per million parts of solution are essentially identical and, when superimposed upon each other, reveal no essential structural differences in the solutions.

The results of extensive tests reveal that only lower alkylenediamines such as ethylenediamine, propylenediamine and similar alkylenediamines, the amino radicals of which are on adjacent carbon atoms, produce this enhanced activity of cyanodithioimidocarbonates at higher pH values. Other strong bases such as ethylamine, diethylamine, triethylamine, trimethylenediamine, tetraethylenediamine, piperidine and other amines such as diethylenetriamine, triethylenetetramine, tetraethylenepentamine, ethanolamine, diethanolamine, triethanolamine, aniline, ortho, meta and para-phenylenediamines, o-aminophenol, pyridine, piperazine, hexamethylenetetramine, hydrazine, thiourea, guanidine carbonate, 2-aminopyridine, cyanamide, morpholine, N-hydroxyethylmorpholine, beta, beta'-iminopropionitrile, 3-aminopropanol, 2-(2-aminoethylamino)ethanol, tris(hydroxymethyl)aminoethanol, although they do not appreciably affect the activity of cyanodithioimidocarbonates at pH values below approximately 5.5, they do not enhance them as does ethylenediamine and its equivalents at pH values between 5.5 and 8, and, in some few cases, they even destroy some of the inherent activity of the cyanodithioimidocarbonates themselves at these higher pH values. Comparative results with several of these other amines are included in Example 1 hereinafter.

It has also been observed that in the use of cyanodithioimidocarbonates, inversion occurs, namely, that, whereas dilute solutions are rapidly lethal, slightly stronger but still dilute solutions are quite compatible with vigorous growth, and still stronger solutions may be lethal again. Although such inversion phenomena are referred to as being "exceedingly rare," by Adrien Albert (in "Selective Toxicity," New York, John Wiley & Sons, Inc., 1951, pages 126 to 128), they are observed in the use of dilute solutions of 8-quinolinol, and with other organic sulfur compounds such as tetramethylthiuram monosulfide, acting on fungal spores (H. B. S. Montgomery and H. Shaw, Nature, 1943, vol. 151, page 333), and dilute solutions of sodium dimethyldithiocarbamate acting on spores of Aspergillus niger (A. K. Sijpesteyn and G. J. M. van der Kerk, Biochimica et Biophysica Acta, 1954, vol. 15, pages 69 to 77). By use of alkylenediamines as described herein, the zones of inversion observed with dilute solutions of cyanodithioimidocarbonates disappear and the toxicity does not decrease with increasing concentration at these high dilutions. Insofar as known, there is no instance of obviating inversion such as has been observed in connection with dilute solutions of 8-quinolinol and tetramethylthiuram monosulfide by addition of other substances such as ethylenediamine.

The cyanodithioimidocarbonates and solutions thereof may be prepared in known manner or as described in copending (now abandoned) application Serial No. 494,286 which consists essentially of reacting together carbon disulfide and an alkali-metal salt of cyanamide. To such solutions may be added alkali-metal sulfites, bisulfites, sulfides, or thiosulfates in small amounts to prevent or retard oxidation of the cyanodithioimidocarbonate as therein described. Sulfur dioxide charged into the solution in an amount corresponding to about 0.5 percent by weight of solution containing 20 percent by weight, for example, of sodium cyanodithioimidocarbonate, is normally sufficient for such purpose. The ethylenediamine or other alkylenediamine can then be added directly to this solution in the specified amount.

The amount of the alkylenediamine which should be added to the alkali-metal or alkaline-earth-metal cyanodithioimidocarbonate to obtain its greatest effectiveness for use as disclosed in this application is approximately one molecular equivalent, that is, equimolecular proportions of each should be used. In the case of equimolecular proportions of sodium cyanodithioimidocarbonate and ethylenediamine, this amount is approximately 0.37 part by weight of ethylenediamine to each part by weight of sodium cyanodithioimidocarbonate, or 0.074 part by weight of ethylenediamine for each part by weight of a 20-percent-by-weight solution. Such proportion generally produces optimum effectiveness; the inclusion of greater amounts of the alkylenediamine (more than 1.5 moles per mole) appears to have no particular advantage. On the other hand, the use of smaller proportions, for example, the use of intermediate proportions to as low as one-fourth of the optimum amount, in most cases, produces an enhancement (but less than the optimum) of the effectiveness of the cyanodithioimidocarbonate in the respects specified.

Although the present invention is applicable to use for all purposes described in copending (now abandoned) application Serial No. 494,286, combinations of alkylenediamines and alkali-metal or alkaline-earth-metal cyanodithioimidocarbonates are also useful generally as bactericides and have demonstrated fungistatic activity against molds such as Penicillium roqueforti at concentrations of 400 parts per million and against Aspergillus terreus at 1000 parts per million (incubation at 82° F.

in pulp substrate for two weeks). Consequently they can be expected to have utility as fungicides, particularly in such applications where more powerful toxicants cannot be used because of their lack of some of the other desirable properties possessed by the compositions of the present invention.

The compositions of the present invention have proved effective in preventing slime formation in industrial applications, as illustrated in the examples which follow hereinafter. The results of tests by the pulp-substrate test method are also included in Example 1 hereinafter.

The pulp-substrate test method, which is described in the article by John W. Appling, N. Jean Ridenour and Stanley J. Buckman, published in TAPPI, August 1951, vol. 34, No. 8, pages 347 to 352, beginning at page 350, simulates the conditions prevailing during actual paper-making operations, that is, those existing in a simple furnish for papermaking. In order that results of such test methods be significant and be reproducible and comparable directly with results obtained by the use of other toxicants, it is necessary to conduct them with pure cultures of single microorganisms, although in actual industrial operations the contamination which produces deterioration of the pulp or other organic matter, and formation of slime, is generally more complex and is invariably the result of the growth and deleterious action of more than one species of microorganism. Nonetheless, such tests with pure cultures are severe and are a method of obtaining a preliminary evaluation of the effectiveness of agents for use in the prevention and control of contamination by microorganisms generally encountered in industrial operations, especially in the production of pulp and paper.

The pulp-substrate tests referred to in the following examples were conducted upon a pulp substrate that consisted of a sterile aqueous slurry of spruce groundwood containing 1 percent by weight (dry basis) of wood fibers. The substrate and its inoculation with a suspension of the test organism was completed by adding, to Pyrex 180-ml. milk dilution bottles fitted with Escher rubber stoppers, aliquot 40-gram portions of the substrate, and, after sterilizing the bottles and their contents, adding to each the following substances in the following order:

(1) Sterile distilled water that is required in each individual case to bring the total weight of the contents of each bottle to 50 grams, after all subsequent additions specified hereinafter (including inoculation with the aqueous suspension of test organism) have been made.

(2) One milliliter of a 2.0-percent-by-weight sterile solution of rosin size. Rosin size is the pasty sodium soap of rosin containing approximately 20 to 30 percent free rosin and 30 percent water. A suitable rosin size is that known as rosin size 70D made by Papermakers' Chemical Department, Hercules Powder Co., Kalamazoo, Michigan.

(3) Solution of toxicant or control agent to be evaluated in such individual volumes as give the concentration desired in each test; the amount is computed in parts per million by weight.

(4a) Sterile solution of alum in an amount that has been predetermined to produce a pH between 5.0 and 5.5 This solution is generally one containing 0.4 gram of hydrated papermakers' alum $(Al_2(SO_4)_3 \cdot 18H_2O)$ per 100 grams, or alternatively, the following (4b):

(4b) Sterile solutions of buffer salts to adjust the substrate to other pH values, if required as described hereinafter.

(5) Inoculum consisting of 1 milliliter of an aqueous suspension of the test organism. *Aerobacter aerogenes* was used in all tests while *Pseudomonas aeruginosa* or another *Pseudomonas* species was used additionally in some.

In cases where buffer salts were added (4b above), they were added in the form of an undiluted mixture of 0.2-molar solutions in an amount of 5 milliliters. These buffer mixtures were each prepared by mixing the quantities of each of the 0.2-molar solutions that are specified in standard published buffer tables to obtain mixtures having the desired pH. Although, by adding 5 milliliters of such undiluted buffer mixtures to each pulp-substrate sample, each contained only a fraction (⅓ or less) of the quantity of the buffer salts that would be present in the standard buffer mixture at that concentration, this was immaterial, since the pH of a buffer mixture does not change substantially on dilution, and the quantities of buffer salts present in each of the pulp substrates were in the correct proportions to each other. The pH values of the resulting buffered pulp substrates were also checked electrometrically.

The buffer mixtures used for covering the various pH ranges specified in the examples were prepared from the following solutions:

pH 4.0 to 5.0—0.2 M solutions of (1) potassium acid phthalate and (2) sodium hydroxide.
pH 6.0 to 8.0—0.2 M solutions of (1) monopotassium phosphate and (2) sodium hydroxide.

The buffer mixtures that were used are those which are commonly referred to as Clark and Lubs' Buffer Mixtures, for whose exact compositions, tables should be consulted (see, for example, that in Snell and Snell, "Colorimetric Methods of Analysis," D. Van Nostrand Co., New York, 1948, third ed., vol. I, pages 170–177).

After the inoculant suspensions of the test organisms had been added to the bottles, they were allowed to stand for a period between 18 and 20 hours at an incubation temperature of 37° C., at which time a portion of the pulp culture was withdrawn, diluted and plated on a nutrient agar medimum and incubated for 48 hours at 37° C. The number of colonies on each plate was determined and the results were converted to the number of colonies per milliliter of substrate.

From these data, the percentage kills were calculated as described in the article in TAPPI referred to hereinbefore. The difference between the count for the control substrate (with no toxicant) and the count obtained from the substrate containing toxicant is divided by the count for the control substrate to give the fraction killed, which is then converted to "percentage killed" by multiplication by 100. These results are specified in the examples as percentage kills. A percentage kill of 80 percent or higher represents an extremely useful composition, and it does not follow that higher kills are necessarily better or more desirable.

*Example 1*

The following compositions were tested by the pulp-substrate method using *Aerobacter aerogenes* and pulp substrates that were buffered as hereinbefore described to pH values of 6.5 and 7.5 respectively:

(1) Sodium cyanodithioimidocarbonate.
(2) Equimolecular proportions of sodium cyanodithioimidocarbonate and ethylenediamine.
(3) Equimolecular proportions of sodium cyanodithioimidocarbonate and propylenediamine.
(4) Equimolecular proportions of sodium cyanodithioimidocarbonate and diethylenetriamine.
(5) Equimolecular proportions of sodium cyanodithioimidocarbonate and ethanolamine.

The results obtained from four independent determinations at each concentration were averaged and the average values are tabulated below. The concentrations represent parts per million (p.p.m.) of the composition and refer to the total weight of the ingredients specified; for example, 1 p.p.m. of composition 2, for example, contains slightly less sodium cyanodithioimidocarbonatae than 1 p.p.m. of composition 1, because of the added ethylenediamine. The results for compositions 1, 4 and 5 are supplied merely for purposes of comparison.

| Composition | Concentration in p.p.m. | Percent kill at pH 6.5 | Percent kill at pH 7.5 |
|---|---|---|---|
| 1. Sodium cyanodithioimidocarbonate | 0.1 | 15.3 | |
| | 0.2 | 41.0 | |
| | 0.4 | 87.9 | |
| | 0.6 | 95.2 | 9.5 |
| | 1 | 92.5 | 10.5 |
| | 2 | 94.3 | 19.3 |
| | 4 | 32.3 | 29.5 |
| | 6 | | 29.5 |
| | 10 | | 51.3 |
| | 16 | | 8.0 |
| 2. Sodium cyanodithioimidocarbonate and ethylenediamine | 0.1 | 22.0 | |
| | 0.2 | 37.0 | |
| | 0.4 | 91.5 | |
| | 0.6 | 98.5 | 18.3 |
| | 1 | 98.5 | 36.0 |
| | 2 | 98.5 | 73.3 |
| | 4 | 99.3 | 89.1 |
| | 6 | | 97.3 |
| | 10 | | 98.2 |
| | 16 | | 99.5 |
| 3. Sodium cyanodithioimidocarbonate and propylenediamine | 0.1 | 24.8 | |
| | 0.2 | 20.8 | |
| | 0.4 | 94.8 | |
| | 0.6 | 96.9 | |
| | 1 | 95.8 | 24.0 |
| | 2 | 85.5 | 70.5 |
| | 4 | 82.0 | 74.1 |
| | 6 | | 94.4 |
| | 10 | | 92.2 |
| | 16 | | 98.5 |
| 4. Sodium cyanodithioimidocarbanate and diethylenetriamine | 0.1 | 36.0 | |
| | 0.2 | 44.3 | |
| | 0.4 | 98.0 | |
| | 0.6 | 99.9 | 32.3 |
| | 1 | 99.9 | 36.0 |
| | 2 | 99.9 | 24.3 |
| | 4 | 94.3 | 49.0 |
| | 6 | | 32.3 |
| | 10 | | 42.5 |
| | 16 | | 55.0 |
| 5. Sodium cyanodithioimidocarbonate and ethanolamine | 0.1 | 4.0 | |
| | 0.2 | 7.0 | |
| | 0.4 | 86.3 | |
| | 0.6 | 83.1 | |
| | 1 | 81.5 | 6.9 |
| | 2 | 75.5 | 17.0 |
| | 4 | 39.5 | 8.9 |
| | 6 | | 8.3 |
| | 10 | | 2.3 |
| | 16 | | 12.3 |

Figure 2:
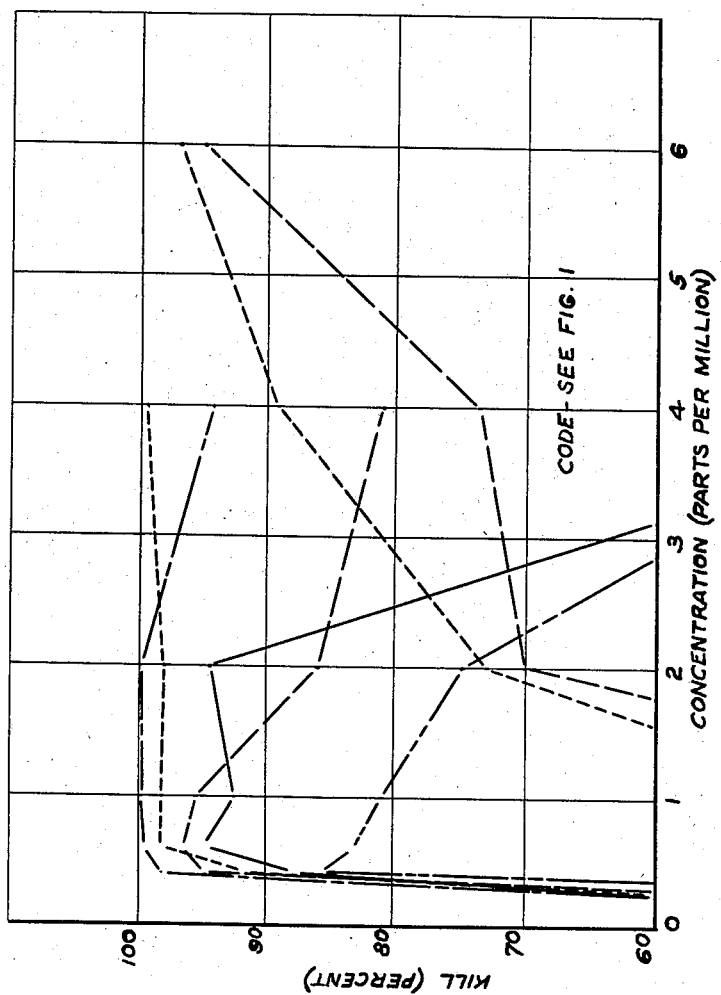

The foregoing results are represented in the two graphical drawings accompanying this application. Figure 2 is merely an enlarged section of the graphs of Figure 1 within the area defined by kills between 60 and 100 percent (ordinates axis) and concentrations from 0 to 6 p.p.m. (abscissae). It is to be noted, from the code on the draft, that each of the five compositions (referring to the foregoing table) is represented by two identically coded lines. Each line that ends at a concentration of 4 p.p.m. represents the result obtained at a pH of 6.5, while each of the other lines (ending at a concentration of 16 p.p.m.) represents the result obtained at a pH of 7.5.

*Example 2*

In a paper mill for the production of kraft bag and wrapping paper in which considerable difficulty was being caused by slime formation, and in which it was necessary to shut down the machine sometimes as often as twice every 24 hours to remove slime and slugs that had accumulated on the wires of the Fourdrinier machine and caused spots and holes in the paper, the operations were changed so that a solution containing 20 percent by weight of sodium cyanodithioimidocarbonate and an equimolecular proportion of ethylenediamine was added to each beater batch. The amount added was such that the concentration of the combined cyanodithioimidocarbonate and ethylenediamine in the system was between 1 and 3 p.p.m. at the paper machine. On the first trial, the machine continued in operation for three days before a shutdown attributable to slime occurred and has since been operating without shutdowns for longer periods.

In this particular operation, the machine was producing 140 tons of kraft wrapping paper in the 30 to 50- basis weight range per 24 hours. The pH of the treated furnish was generally between 6.5 and 7.0 and the headbox temperature was 80–85° F. Additives included in the furnish were starch at a level of 1.0 percent; and, when paper of higher wet strength was desired, alum and a melamine resin were included. The water supply was river or lake water to which aluminum sulfate was added, filtered, and then was chlorinated to a residual concentration of 0.6 part per million, which was dissipated before the water reached the paper machine. The addition of the cyanodithioimidocarbonate-alkylenediamine composition was made at the beater, from which the pulp was discharged to beater chests, and thence through conventional processing equipment and chests to the Fourdrinier machine.

*Example 3*

In a mill making paperboard for corrugating, in which the pH ranges of the pulp and waters in process ranged between 5.0 and 7.5 and the furnish contained approximately 1.0 percent of tapioca or cornstarch and in which slime growth was a pernicious problem, the growth of slime was controlled by charging the sodium cyanodithioimidocarbonate-ethylenediamine composition described in the foregoing example to the headboxes of the Fourdrinier machine at a rate such that from 0.5 to 3.0 p.p.m. of sodium cyanodithioimidocarbonate-ethylenediamine composition were present in the furnish at the wire.

In using the bactericidal and slime-controlling composition of the present invention for control of slime in papermaking operations, the aqueous solution of the alkali-metal or alkaline-earth-metal salt of cyanodithioimidocarbonic acid containing the alkylenediamine and sulfite or other stabilizer is added in such amounts as to maintain a concentration of approximately 1 to 3 p.p.m. or greater in the pulp or furnish and circulating waters associated therewith. These additions may be made at any of the units or machines involved in the process, for example, at the beaters or to the complete furnish or even at the Fourdrinier headbox, but the addition is preferably made at a location close to the paper machine proper. It is advantageous to recycle and reuse the white waters, since they contain significant proportions of fiber and other furnish components, as well as heat and a portion of the toxicant, all of which should be conserved. This can only be accomplished by adequate control of slime, since closed systems, in which the maximum amount of white water is recirculated, present slime control problems of increased difficulty. These problems probably are attributable to the increased amount of soluble nutrient materials, particularly those in the form of sugars, which accumulate therein, and also to its higher temperature, both of which are generally more favorable to growth of microorganisms.

The terms "alkali-metal" and "alkaline-earth-metal" have been used herein in accordance with their generally accepted meaning, and to include sodium, potassium, calcium, and barium, as well as the other less common metals of these groups.

Inasmuch as the foregoing specification comprises preferred embodiments of the invention, which were selected merely for purposes of illustration, it is to be understood that variations and modifications may be made therein in conventional manner and in accordance with the teachings thereof, without departing from the invention or its scope as defined in the appended claims.

What is claimed is:

1. A pesticidal composition comprising as essential active ingredients the products resulting from mixing together (1) a salt of the group consisting of alkali-metal and alkaline-earth-metal cyanodithioimidocarbonates and (2) a lower diaminoalkane having not more than six carbon atoms in which the amino substituent radicals are on adjacent carbon atoms in a molecular ratio not substantially in excess of 1.5 moles of the diaminoalkane to each mole of the cyanodithioimidocarbonate.

2. A pesticidal composition as defined in claim 1 in which the diaminoalkane is ethylenediamine.

3. A pesticidal composition as defined in claim 1 in which the diaminoalkane is propylenediamine.

4. A pesticidal composition as defined in claim 1 in which the diaminoalkane is present in an amount between approximately 0.25 and approximately 1.5 moles per mole of the cyanodithioimidocarbonate.

5. A process of inhibiting microbiological deterioration of an organic cellulosic substance that is susceptible to deterioration by the action of microorganisms and inhibiting the formation of slime in aqueous fluids that are in contact with such substance, which comprises adding to the said aqueous fluid a water-soluble salt of cyanodithioimidocarbonic acid together with a lower diaminoalkane having not more than six carbon atoms in which the amino substituent radicals are on adjacent carbon atoms in proportions within the range of approximately 0.25 to approximately 1.5 moles of the diaminoalkane to each mole of the cyanodithioimidocarbonate in an amount sufficient to prevent microbiological deterioration of the organic substance and inhibit the formation of slime in the aqueous fluid.

6. A process as defined in claim 5 in which the mixture of diaminoalkane and cyanodithioimidocarbonate is added in an amount between 0.1 and 20 parts per million.

7. The method of controlling the growth and deposition of slime-forming organisms in flowing-water systems, which comprises adding to the flowing water in such system a composition as defined in claim 1 in an amount between approximately 0.1 and approximately 20 parts per million of the water.

8. In the production of paper from cellulosic pulp, the method of inhibiting the microbiological deterioration of such pulp and the formation of slime in aqueous fluids and on surfaces that are in contact with such pulp, which comprises adding to the aqueous fluids between approximately 0.1 and approximately 20 parts per million of a composition as defined in claim 1.

9. An aqueous suspension of cellulosic pulp intended for use in the production of paper which is normally susceptible to microbiological deterioration and slime formation, which contains, for the purpose of inhibiting such deterioration and slime formation, between approximately 0.1 and approximately 20 parts per million of a composition as defined in claim 1.

10. A pesticidal composition consisting essentially of an aqueous solution containing approximately 20 percent by weight of an alkali-metal cyanodithioimidocarbonate, approximately one molecular equivalent of ethylenediamine, and approximately 0.5 percent by weight of sulfur dioxide in the form of an alkali-metal sulfite.

References Cited in the file of this patent
UNITED STATES PATENTS

| | | |
|---|---|---|
| 1,972,961 | Tisdale et al. | Sept. 11, 1934 |
| 2,393,293 | Corley | Jan. 22, 1946 |
| 2,564,430 | Gillaspie | Aug. 14, 1951 |
| 2,576,442 | Borglin et al. | Nov. 27, 1951 |
| 2,588,428 | Stewart et al. | Mar. 11, 1952 |
| 2,629,681 | Hill | Feb. 24, 1953 |
| 2,686,119 | Buckman et al. | Aug. 10, 1954 |
| 2,757,119 | Bennett et al. | July 31, 1956 |
| 2,780,546 | Moyle et al. | Feb. 5, 1957 |
| 2,816,136 | Pera | Dec. 10, 1957 |